United States Patent
Pries et al.

(10) Patent No.: US 11,916,404 B1
(45) Date of Patent: Feb. 27, 2024

(54) TUNING CIRCUITRY FOR A WIRELESS POWER SYSTEM

(71) Applicant: UT-Battelle, LLC, Oak Ridge, TN (US)

(72) Inventors: Jason L. Pries, Oak Ridge, TN (US);
Omer C. Onar, Oak Ridge, TN (US);
Gui-Jia Su, Oak Ridge, TN (US); Veda Galigekere, Oak Ridge, TN (US);
Mostak Mohammad, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 17/742,770

(22) Filed: May 12, 2022

Related U.S. Application Data

(60) Provisional application No. 63/187,539, filed on May 12, 2021.

(51) Int. Cl.
*H02J 50/12* (2016.01)
*H02J 50/40* (2016.01)
*B60L 53/122* (2019.01)

(52) U.S. Cl.
CPC ............ *H02J 50/12* (2016.02); *B60L 53/122* (2019.02); *H02J 50/40* (2016.02); *H02J 2310/48* (2020.01)

(58) Field of Classification Search
CPC ............ H02J 50/10; H02J 50/12; B60L 53/00
See application file for complete search history.

(56) References Cited

U.S. PATENT DOCUMENTS

| 2017/0222484 A1* | 8/2017 | DeBaun | B60L 53/38 |
| 2019/0023134 A1* | 1/2019 | Cha | H02M 3/33515 |
| 2022/0250487 A1* | 8/2022 | Mao | H02J 7/02 |

FOREIGN PATENT DOCUMENTS

CN        103746462 B        1/2016

OTHER PUBLICATIONS

Li, S. et al., "A Double-Sided LCC Compensation Network and Its Tuning Method for Wireless Power Transfer", IEEE Transactions on Vehicular Technology, vol. 64, No. 6, Jun. 2015, pp. 2261-2273.

* cited by examiner

*Primary Examiner* — Hal Kaplan
*Assistant Examiner* — Joseph N Inge
(74) *Attorney, Agent, or Firm* — Warner Norcross + Judd LLP

(57) ABSTRACT

A wireless power supply power supply including first tuning circuitry coupled directly to a transmitter, the first tuning circuitry including an LCC configuration. The wireless power supply may include second tuning circuitry coupled directly to switching circuitry (e.g., an inverter) of the power supply, where the second tuning circuitry may be operable to direct power from the switching circuitry to the first tuning circuitry for supply to the transmitter, and where the second tuning circuitry includes a reactance operable to establish inductive operation of the switching circuitry at the switching frequency of the switching circuitry.

17 Claims, 5 Drawing Sheets

TUNING CIRCUITRY FOR A WIRELESS POWER SYSTEM

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF INVENTION

The present disclosure relates to the field of wireless power transfer systems, also described as wireless energy transfer systems.

BACKGROUND

Conventional wireless power transfer systems enable elimination of physical electrical contacts and provide several advantages in supplying power to electric vehicle batteries. Conventional Plug-in Electric Vehicle (PEV) and Electric Vehicle (EV) charging systems may include one or two charging points, such as a wireless charging point or a wired charging platform. In this arrangement, a conventional wireless power transfer (WPT) system is often configured to receive power from an AC power source, and to wirelessly couple with the vehicle side receiver and vehicle side power electronics.

Conventional WPT systems may incorporate an LCC compensation circuit in an effort to compensate for a large inductive reactance of the coupling coils (e.g., the transmitter and receiver). This conventional LCC compensation construction is implemented to reduce the coil size in order to accommodate the high power levels needed for electrical vehicle charging applications since the LCC resonant tuning network (also known as compensation network or resonant tuning circuitry) allow injecting higher currents into the transmitter coil. Although this LCC compensation circuit operates well at rated or designed power levels, it can adversely affect operation of the WPT system at light load (lower than rated power) conditions. This is due to the fact that in light-load conditions, continuous conduction operation may not be ensured since the current on the inductor of the LCC network can be much lower than the rated/full power conditions.

SUMMARY

In general, one innovative aspect of the subject matter described herein can be embodied in a wireless power transfer (WPT) system for wirelessly providing high-frequency AC power to an electric vehicle (EV) or a plug-in electric vehicle (PEV). The system may include an off-board transmitter including an inverter having an output, a transmitter coil configured to wirelessly transmit the high-frequency AC power, and a resonant tuning network including first circuitry coupled to the transmitter coil and second circuitry coupled between the output of the inverter and the first circuitry. The first circuitry may include a first inductor and a first capacitor connected in series to the transmitter coil. A second capacitor may be connected in parallel to the first capacitor and the transmitter coil. The second circuitry may be configured to cause inductive operation of the inverter at a switching frequency of the inverter; and where the second circuitry may include a second inductor connected in series to the first inductor of the first circuitry.

The foregoing and other embodiments can each optionally include one or more of the following features, alone or in combination. In particular, one embodiment includes all the following features in combination.

In some embodiments, the second circuitry may include a second capacitor connected in series to the second inductor. Inductance of the second inductor and capacitance of the second capacitor may be configured to cause the second circuitry to resonate at the switching frequency of the inverter.

In some embodiments, the second inductor may include an additional winding that is wound on a core of the first inductor, and where the additional winding may extend a winding of the first inductor.

In some embodiments, the inductive operation of the inverter may correspond to a power factor in a range of 0.95 to 0.99.

In some embodiments, a fundamental frequency of the high-frequency AC power may be in a range of 3 kHz–10 MHz.

In some embodiments, the fundamental frequency is about 85 kHz.

In some embodiments, the system may include a wireless power receiver with a receiver including a pick-up coil. The receiver may be configured to receive the high-frequency AC power when the transmitter coil and the pick-up coils are disposed adjacent to each other. The wireless power receiver may include a receiver side resonant tuning network and a high-frequency rectifier to provide DC current to a receiver-side load.

In some embodiments, the receiver-side load may be a battery.

In general, one innovative aspect of the subject matter described herein can be embodied in a system for wirelessly transferring power to a remote device. The system may include a transmitter configured to wirelessly transmit power to a receiver of the remote device, and switching circuitry coupled to the transmitter. The switching circuitry may be configured to receive power from a power supply, and may be configured to supply power to the transmitter based on the power received from the power supply. The system may include control circuitry operably coupled to the switching circuitry, and configured to direct operation of the switching circuitry according to a switching frequency.

The system may include first tuning circuitry coupled directly to the transmitter. The first tuning circuitry may include a first inductor and a first capacitor connected in series with the transmitter. The first tuning circuitry may include a second capacitor connected in parallel to the first capacitor and the transmitter. The system may include second tuning circuitry coupled directly to the switching circuitry, and operable to direct power from the switching circuitry to the first tuning circuitry for supply to the transmitter. The second tuning circuitry may include a reactance operable to establish inductive operation of the switching circuitry at the switching frequency of the switching circuitry.

The foregoing and other embodiments can each optionally include one or more of the following features, alone or in combination. In particular, one embodiment includes all the following features in combination.

In some embodiments, the second tuning circuitry may include a second inductor provided in series with the first inductor of the first tuning circuitry, where an inductance of the second inductor may define at least a portion of the reactance of the second tuning circuitry.

In some embodiments, the second inductor may be separate from the first inductor.

In some embodiments, the first inductor may include a main winding portion, and where the second inductor may correspond to a supplemental winding portion of the first inductor.

In some embodiments, the first inductor may include an inductor core with a magnetic airgap, and wherein the second inductor may be established by reducing the magnetic airgap of the first inductor.

In some embodiments, the second tuning circuitry may include a third capacitor provided in series with the second inductor and the first inductor of the first tuning circuitry, where a capacitance of the third capacitor and the inductance of the second inductor may define the reactance of the second tuning circuitry.

In some embodiments, the second tuning circuitry may include a third capacitor provided in series with the first inductor of the first tuning circuitry. A capacitance of the third capacitor may define at least a portion of the reactance of the second tuning circuitry.

In some embodiments, the reactance of the second tuning circuitry may establish zero voltage switching operation for the switching circuitry at the switching frequency of the switching circuitry.

In some embodiments, the reactance of the second tuning circuitry may mitigate current harmonics of the switching circuitry.

In some embodiments, the system may include the remote device, where the remote device may include a load. The remote device may be operable to supply power received from the transmitter, via the receiver, to the load.

In some embodiments, inductive operation of the switching circuitry may correspond to a power factor in a range 0.80 to 0.99.

In some embodiments, the power factor may be in a range of 0.95 to 0.99.

In some embodiments, the switching frequency may be between 3 kHz and 10 MHz.

In some embodiments, the switching frequency may be about 85 kHz.

In some embodiments, the switching frequency may be varied by the control circuitry.

In general, one innovative aspect of the subject matter described herein can be embodied in a remote device operable to receive and transmit power wirelessly with a wireless power supply. The remote device may include a receiver configured to wirelessly receive and transmit power with respect to a transmitter of the wireless power supply, and a load including a power supply. The remote device may include switching circuitry coupled to the receiver, and configured to receive power from the power supply of the load. The switching circuitry may be configured to supply power to the receiver based on the power received from the power supply, and the switching circuitry may configured to supply power to the load. The remote device may include control circuitry operably coupled to the switching circuitry, and configured to direct operation of the switching circuitry according to a switching frequency.

The remote device may include first tuning circuitry coupled directly to the transmitter. The first tuning circuitry may include a first inductor and a first capacitor connected in series with the transmitter, and may include a second capacitor connected in parallel to the first capacitor and the transmitter. The remote device may include second tuning circuitry coupled directly to the switching circuitry, where the second tuning circuitry may be operable to direct power from the switching circuitry to the first tuning circuitry for supply to the transmitter. The second tuning circuitry may include a reactance operable to establish inductive operation of the switching circuitry at the switching frequency of the switching circuitry.

The foregoing and other embodiments can each optionally include one or more of the following features, alone or in combination. In particular, one embodiment includes all the following features in combination.

In some embodiments, the second tuning circuitry may include a second inductor provided in series with the first inductor of the first tuning circuitry, where an inductance of the second inductor may define at least a portion of the reactance of the second tuning circuitry.

In some embodiments, the second inductor may be separate from the first inductor. In some embodiments, the first inductor may include a main winding portion, and where the second inductor may correspond to a supplemental winding portion of the first inductor.

In some embodiments, the first inductor may include an inductor core with a magnetic airgap, and where the second inductor may be established by reducing the magnetic airgap of the first inductor.

In some embodiments, the second tuning circuitry may include a third capacitor provided in series with the second inductor and the first inductor of the first tuning circuitry. A capacitance of the third capacitor and the inductance of the second inductor may define the reactance of the second tuning circuitry.

In some embodiments, the second tuning circuitry may include a third capacitor provided in series with the first inductor of the first tuning circuitry. A capacitance of the third capacitor may define at least a portion of the reactance of the second tuning circuitry.

In some embodiments, the reactance of the second tuning circuitry may establish zero voltage switching operation for the switching circuitry at the switching frequency of the switching circuitry.

In some embodiments, the reactance of the second tuning circuitry may mitigate current harmonics of the switching circuitry.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DETAILED DESCRIPTION

A wireless power supply may include first tuning circuitry coupled directly to a transmitter, the first tuning circuitry including an LCC configuration. The wireless power supply may include second tuning circuitry in between the switching circuitry (e.g., an inverter) of the power supply and the first tuning circuitry (e.g., the first LCC tuning circuitry where the second tuning circuitry includes a reactance operable to establish inductive operation of the switching circuitry at the switching frequency of the switching circuitry. The second tuning circuitry may be coupled directly to the switching circuitry.

In a wireless power transfer system in one embodiment according to the present disclosure, a resonant tuning network may be provided to compensate the large inductive reactance of the coupling coils (e.g., the transmitter coil and receiver coil) in order to allow sufficient electric current on the transmitter coil that would be needed to reach high power levels for electric vehicle charging applications. Without resonant networks or compensation circuitry, to achieve effective power transfer, the coils may be extremely large with many turns, or the coil current has to be increased substantially, or the frequency may be increased significantly, potentially to an unrealistic level.

As described herein, the wireless power transfer system may include a resonant tuning network that includes an LCC compensation circuit. Additionally, it is noted that the power transfer system may include a supplemental compensation circuit in addition to the LCC compensation circuit. The supplemental compensation circuit may be configured in a variety of ways, and is not limited to those described in conjunction with the embodiments of FIGS. 1-3. For example, the supplemental compensation circuit may be configured in any manner, including a series-series, series-parallel, parallel-series, and parallel-parallel, or higher order resonant tuning networks, or any combination thereof.

In one embodiment, a wireless power transfer system may include an LCC type resonant network that is modified or supplemented with an additional compensation circuit, such as an LC network. In configuration of a resonant tuning network, there is an additional inductance and an optional series capacitor. In an alternative embodiment, the additional inductance can be obtained by increasing the inductance of the existing inductor of the LCC network with a reduction in magnetic airgap of the inductor core or by adding half or a few turns on the inductor winding.

Figure 1:
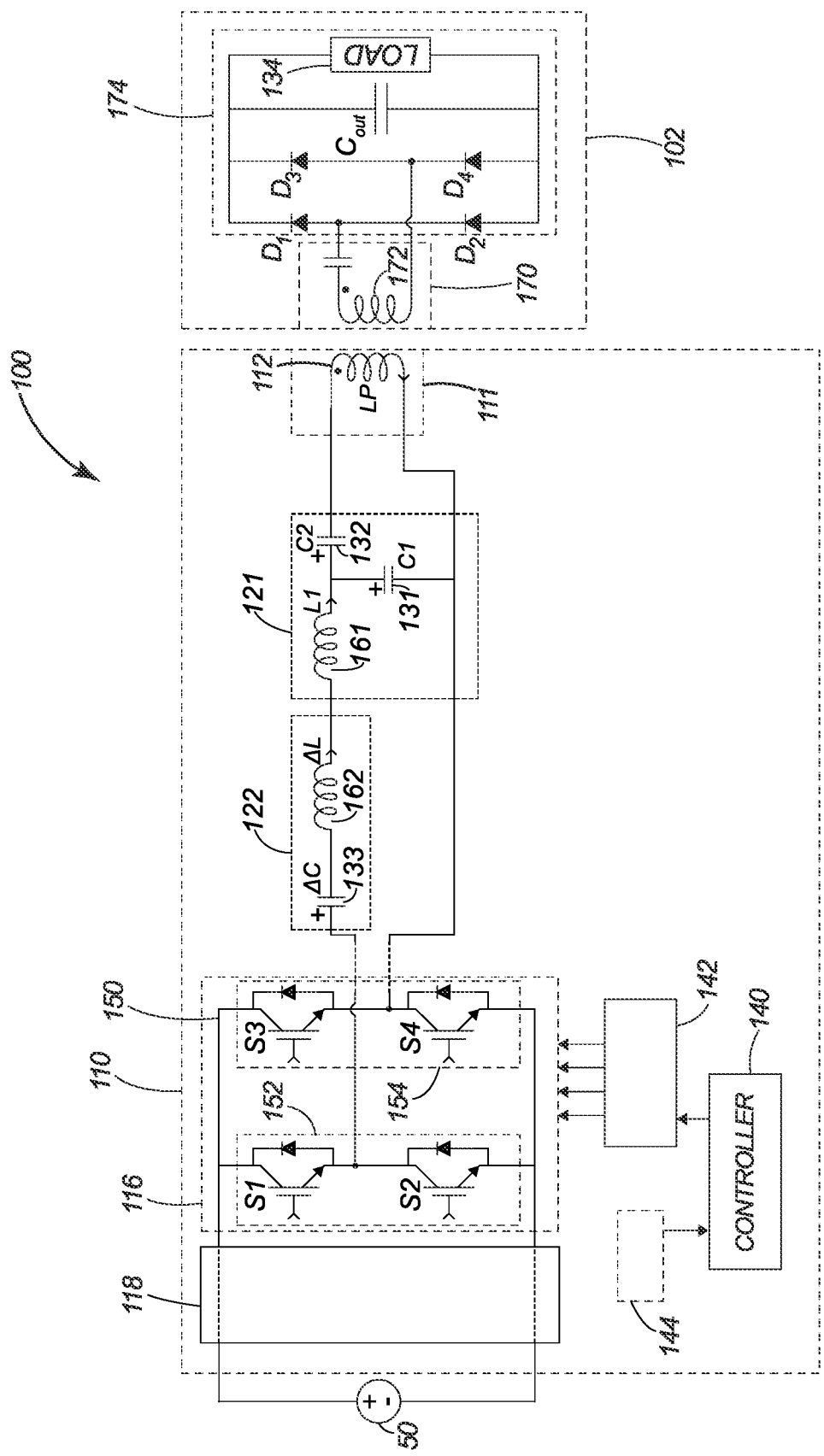
FIG. 1 shows a wireless power supply system in one embodiment according to the present disclosure.
Figure 4:
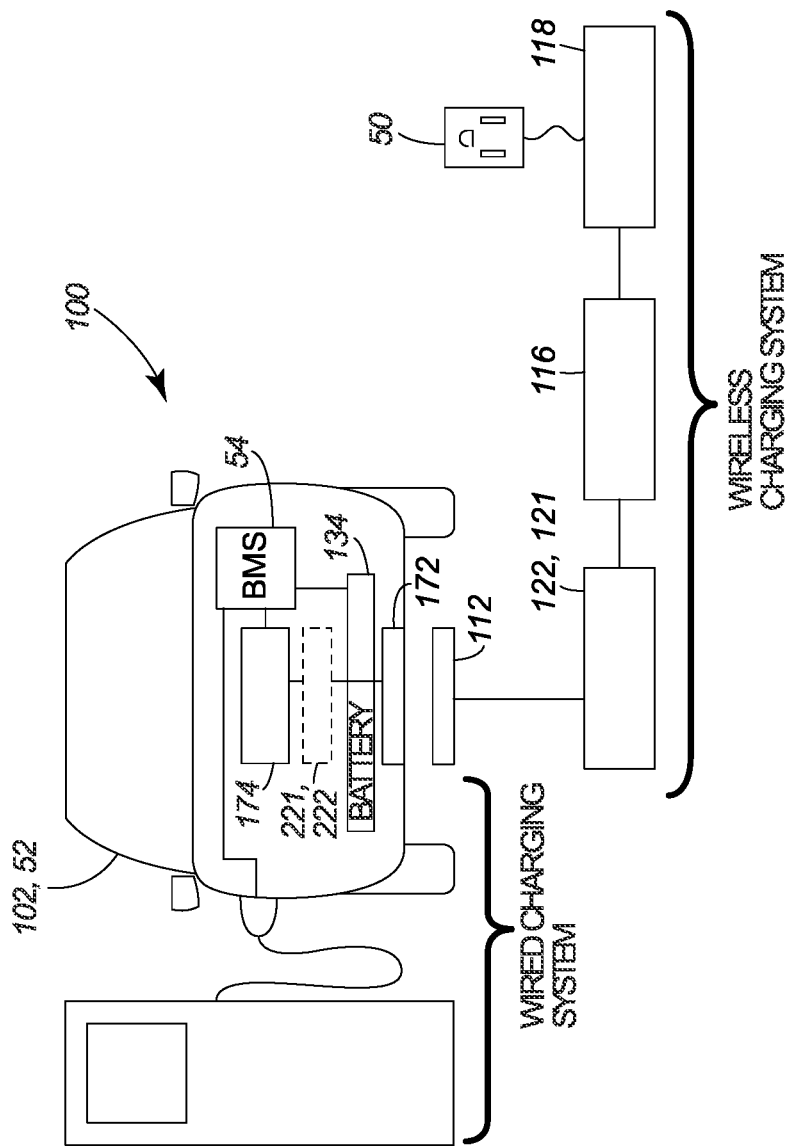
FIG. 4 shows a vehicle charging system in one embodiment according to the present disclosure.

A wireless power system in accordance with one embodiment is shown in FIGS. 1 and 4 and generally designated 100. The wireless power system 100 in the illustrated embodiment includes a remote device 102 and a wireless power supply 110 configured to transmit wireless power to the remote device 102. The remote device 102 may be described as a secondary-side, vehicle-side, or receiver-side with respect to the wireless power supply 110. In one embodiment, the remote device 102 may be operable to transmit power to the wireless power supply 110 (if the diodes in 102 are replaced with active switches), which may be configured to receive wireless power in addition to or as an alternative to transmitting wireless power to the remote device 102. For purposes of disclosure, the remote device 102 is described herein as a vehicle 52; however, the remote device 102 or one or more components thereof may be incorporated into any type of apparatus or device, including, for instance, a mobile phone, a table top appliance, a laptop, a tablet, or a power tool charger or any type of isolated power supply configuration for wireless power with resident converters may be configured in accordance with one or more embodiments described herein.

Additional examples of applications include a vehicle provided as an electric vehicle, a plug-in hybrid electric vehicle, or an electric/plug-in hybrid combat vehicle. Further example applications can relate to energy storage provided in a variety of forms, including a stationary or mobile energy storage system, a low/high voltage battery charger being a cell phone, a laptop, a tablet, a power tool, a gardening tool, a handheld vacuum cleaner, a kitchen gadget, any type of battery charger or adapter, chargers for portable electronics (including cameras, laptops, and cell phones), house-hold appliances with grid isolation requirements, air mobility vehicles (such as electric/hybrid propulsion aircraft, drones, UAVs, and satellites), laser or plasma applications, LEDs, single-phase or three-phase grid systems with medium or low grid voltage networks, fuel cell, solar, or wind turbine renewable energy conversion systems, microturbines (e.g., in grid connected applications), and High Voltage (HV) systems.

The vehicle 52 in the illustrated embodiment includes a wireless power receiver 170 (e.g., a receiver) separable from and capable of coupling with the wireless power supply 110 (e.g., a transmitter), which may also be considered an off-board module. The wireless power receiver 170, as described herein, may be considered an on-board module, and may be configured for transmitting and/or receiving wireless power in one embodiment of the off-board module. The wireless power receiver 170 may form part of an energy storage charging system.

The remote device 102 or vehicle 52 in the illustrated embodiment includes a load 134, such as a battery, operable to use power received wirelessly from the wireless power supply 110. For instance, the wireless power receiver 170 may be coupled to a load 134 to provide power thereto. The load 134 in the illustrated embodiment is part of or coupled to a receiver-side circuitry 174 (or secondary-side circuitry) operable to receive power from the wireless power receiver 170. The load 134 may include a battery (or a battery and a battery management system [BMS]) or any type of principle load, or a combination thereof. The wireless power receiver 170 in the illustrated embodiment includes a receiver 172 (e.g., a secondary coil or a pick-up coil).

In the illustrated embodiment of FIG. 1, the wireless power supply 110 may include a wireless power transmitter 111 having a transmitter 112 (e.g., a primary coil) operable to couple with the receiver 172 for wirelessly transferring power, such as by magnetic coupling or inductive coupling. As described herein, the transmitter 112 and the receiver 172 may vary depending on the application, and are not limited to a single primary coil or a single secondary coil.

The wireless power supply 110 may be operable to receive power from a source 50, which may be a DC source. The wireless power supply 110 may receive power from an AC grid connection, and in this configuration, a grid interface converter, such as an AC/DC rectifier may be used. In one embodiment, the AC source before such an AC/DC rectifier may be provided via grid power or utility power, and may be single phase or three-phase depending on the application as described herein.

The wireless power supply 110 in the illustrated embodiment includes a controller 140 operably coupled to drive circuitry 142. The drive circuitry 142 may include a multiplexor or signal conditioning circuitry, or both, in the form of a gate driver interface to translate output from the controller 140 to direct operation of the switching circuitry 116. Alternatively, the drive circuitry 142 may correspond to pass through conductors that provide a direct connection between switching circuitry 116 and the controller 140.

The wireless power supply 110 may optionally include a sensor 144. The sensor 144 may be configured to detect a characteristic of power of the wireless power supply 110, such as the input and/or output voltage and/or current of the inverter 116, to regulate the charge voltage, current, or power. The sensor 144 may be configured to provide sensor output indicative of the detected characteristic to the controller 140. The sensor 144 is shown separate from the controller 140, but may be integral therewith in one embodiment. The sensor may be located at the input or output of the inverter 116.

The switching circuitry 116 in the illustrated embodiment includes an H-bridge inverter configuration (e.g., a full bridge) with first, second, third, and fourth switches S1, S2, S3, S4 capable of operating in conjunction with each other to supply power to the transmitter 112. The switches S1, S2, S3, S4 may be arranged in an H-bridge configuration with a first leg 152 and a second leg 154. The switching circuitry 116 may also be a three-phase inverter with the addition of another phase-leg.

The switching circuitry 116 may be configured to receive input power 150 from the power supply 50, and to generate AC power to be supplied to the transmitter 112. The controller 140 may direct operation of the switching circuitry 116 according to a switching frequency and duty cycle (pulse width) to generate the high-frequency AC power. The switching frequency may be between 3 kHz and 10 MHz, and may optionally be about 85 kHz. In one embodiment, the controller 140 may be operable to vary a switching frequency of the switching circuitry 116. As an example, the controller 140 may obtain sensor feedback from the sensor 144, and adjust the switching frequency or the duty cycle (pulse width) based on the sensor feedback.

In an alternative embodiment, the switching circuitry 116 may be provided in a half bridge configuration with first and second switches operable to provide power to the transmitter 112. The drive circuitry in this alternative embodiment may be different from the drive circuitry 142 in order to drive first and second switches instead of four switches.

The switches S1, S2, S3, S4 may be MOSFETs or any other type of switch capable of selectively supplying power to the transmitter 112, including for example IGBTs.

In the illustrated embodiment, the wireless power supply 110 includes power conditioning circuitry 118 capable of conditioning the power received from the power source 50.

The power conditioning circuitry 118 in the illustrated embodiment corresponds to a pass-through configuration between the power supply 50 and the switching circuitry 116. However, the present disclosure is not so limited. As an example, the power conditioning circuitry 118 may correspond to rectification circuitry operable to rectify AC power received from an AC power source into DC power as the input power 150 provided to the switching circuitry 116. Additionally, or alternatively, the power conditioning circuitry may include filter or compensation circuitry, such as a choke inductor, a parallel capacitor, or a combination of an inductor and capacitor to form a filter at the point of grid connection. If the power conditioning circuitry 118 is utilized for a grid interface, then the voltage source 50 may be a single or three-phase AC source. If a grid interface is not used or bypassed, then the input source 50 is a DC source.

The controller 140 may be coupled to one or more components of the wireless power systems to achieve operation in accordance with the described functionality and methodology.

The controller 140 may include electrical circuitry and components to carry out the functions and algorithms described herein. Generally speaking, the controller 140 may include one or more microcontrollers, microprocessors, digital signal processors (DSP), and/or other programmable electronics that are programmed to carry out the functions described herein. The controller 140 may additionally or alternatively include other electronic components that are programmed to carry out the functions described herein, or that support the microcontrollers, microprocessors, and/or other electronics. The other electronic components include, but are not limited to, one or more field programmable gate arrays (FPGAs), systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the system or aspects thereof, or they may reside in a common location within the system or an aspect thereof. When physically distributed, the components may communicate using any suitable serial or parallel communication protocol, such as, but not limited to, CAN, LIN, Vehicle Area Network (VAN), FireWire, I2C, RS-232, RS-485, Ethernet, LAN, WiFi, and Universal Serial Bus (USB).

In the illustrated embodiment of FIG. 1, the wireless power supply 110 includes a first compensation circuit 121 and a second compensation circuit 122, which is provided as a supplemental compensation circuit in addition to the first compensation circuit 121. The first compensation circuit 121 in the illustrated embodiment is configured as an LCC compensation circuit, including a first inductor 161, a first capacitor 131, and a second capacitor 132. As described herein, the first compensation circuit 121 may be configured differently, such that the present disclosure is not limited to an LCC compensation circuit configuration.

The second compensation circuit 122 in the illustrated embodiment of FIG. 1 includes a second inductor $\Delta L$, 162 and a third capacitor $\Delta C$, 133. The second inductor 162 and the third capacitor 133 are arranged in a series configuration, and in series with the first inductor 161 of the first compensation circuit 121. For instance, the second inductor 162 may be provided in series with the first inductor 161 or the second capacitor 132, or both. Additionally, the third capacitor 133 may be provided in series with the first inductor 161 or the second capacitor 132, or both.

In one embodiment, the second compensation circuit 122 may be provided by modifying the first compensation circuit 121. For example, the second inductor 162 of the second compensation circuit 122 may be provided by modifying or supplementing the first inductor 161 of the first compensation circuit 121. An example of a modification of the first inductor 161 includes decreasing a magnetic airgap of an inductor core of the first inductor 161. An example of supplementing the first inductor 161 includes providing a supplemental winding (e.g., adding more turns) portion of the first inductor 161 in addition to a main winding portion of the first inductor 161.

In the illustrated embodiment FIG. 4, the wireless power system 100 is shown in conjunction with a remote device 102 in the form of a vehicle 52. The vehicle 52 is shown additionally in conjunction with a wired charging system for receipt of power via a wired interface in a battery management system 54, which may manage charging of the load 134 (e.g., a battery) based on receipt of power from the wired charging system or the wireless power system 100.

The wireless power system 100, in the illustrated embodiment, is configured to receive power from an AC power source 50, and includes power conditioning circuitry 118 configured to rectify the AC power received from the AC power source 50 into DC power for the switching circuitry 116. The first and second compensation circuitry 121, 122 may be provided, as described herein, between the switching circuitry 116 and the transmitter 112. By selective control of the switching circuitry 116, power may be supplied to the transmitter 112 via the first and second compensation circuitry 121, 122 in order to transfer power wirelessly to the receiver 172.

Power transmitted wirelessly from the transmitter 112 to the receiver 172 may be provided to receiver-side circuitry 174, which may rectify AC power output from the receiver 172 into DC power supplied to the battery 134 via the battery management system 54. It is to be understood that the battery management system 54 may be absent relative to power transfer from the wireless power system 100 to the battery 134. Additionally, or alternatively, the battery management system 54 may be absent relative to power transfer from the wired charging system depicted in the illustrated embodiment.

Optionally, the wireless power system 100 may include first remote device compensation circuitry 221 and second remote device compensation circuitry 222, which may be configured in a manner similar to the first and second compensation circuitry 121, 122.

For a wireless power transfer system 100 in accordance with one embodiment, the primary coil, also described as a transmitter coil or the transmitter 112 or transmitter inductance, may vary from application to application depending on construction, a primary coil current, or a power level, or a combination thereof. If the inductance of the transmitter 112 and the current through the transmitter 112 are known, the main resonant tuning inductance and the resident tuning capacitors may be sized and configured according to the following:

$$L_1 = \frac{4V_{dc}}{\sqrt{2}\omega \pi I_p}$$

-continued
$$C_1 = \frac{4V_{dc}}{\omega^2 L_1}$$

$$C_2 = \frac{1}{\omega^2(L_p - L_1)}$$

In the resonant tuning network according to one embodiment, a reactance may be provided by a second compensation circuit 122. The net reactance provided by the circuitry may be close to or approximately zero at switching frequency, or the circuitry may provide a slightly inductive reactance at switching frequency. A capacitive reactance may be avoided or reduced by the circuitry, relative to the second compensation circuitry 122. If the first inductor 161 is oversized (e.g., having higher inductance than required for target operation), then a capacitive reactance that can be formed within the second compensation circuitry 122 may be considered acceptable. The reactance of the second compensation circuitry 122 may be in the form of an inductance and/or a capacitance of the second compensation circuit 122. For example, an inductance ΔL 162, potentially small relative to the inductance of the first inductor 161, may be provided in a second compensation circuit 122, optionally in a standalone manner without a series capacitor, such as the third capacitor 133. Alternatively, the second compensation circuit 122 may include the third capacitor 133 to provide a series capacitor for the inductance ΔL 162. The second inductor 162, ΔL and the third capacitor 133 may be configured according to the following:

$$2\pi f \Delta L = \frac{1}{2\pi f \Delta C}$$

$$\Delta C = \frac{1}{4\pi^2 f^2 \Delta L}$$

The second inductor 162, ΔL may be implemented as an independent inductor separate from the first inductor 161, including a separate inductor core that is separate from the inductor core of the first inductor 161.

Alternatively, the second inductor 162, ΔL may be configured as additional winding turns that are provided in addition to a main winding portion of the first inductor 161. As another alternative, the second inductor 162, ΔL may be established by reducing a magnetic airgap of an inductive core of the first inductor 161. As another alternative, additional magnetic cores can be stacked with the existing magnetic cores of the inductor 161 to increase the inductance.

Figure 2:
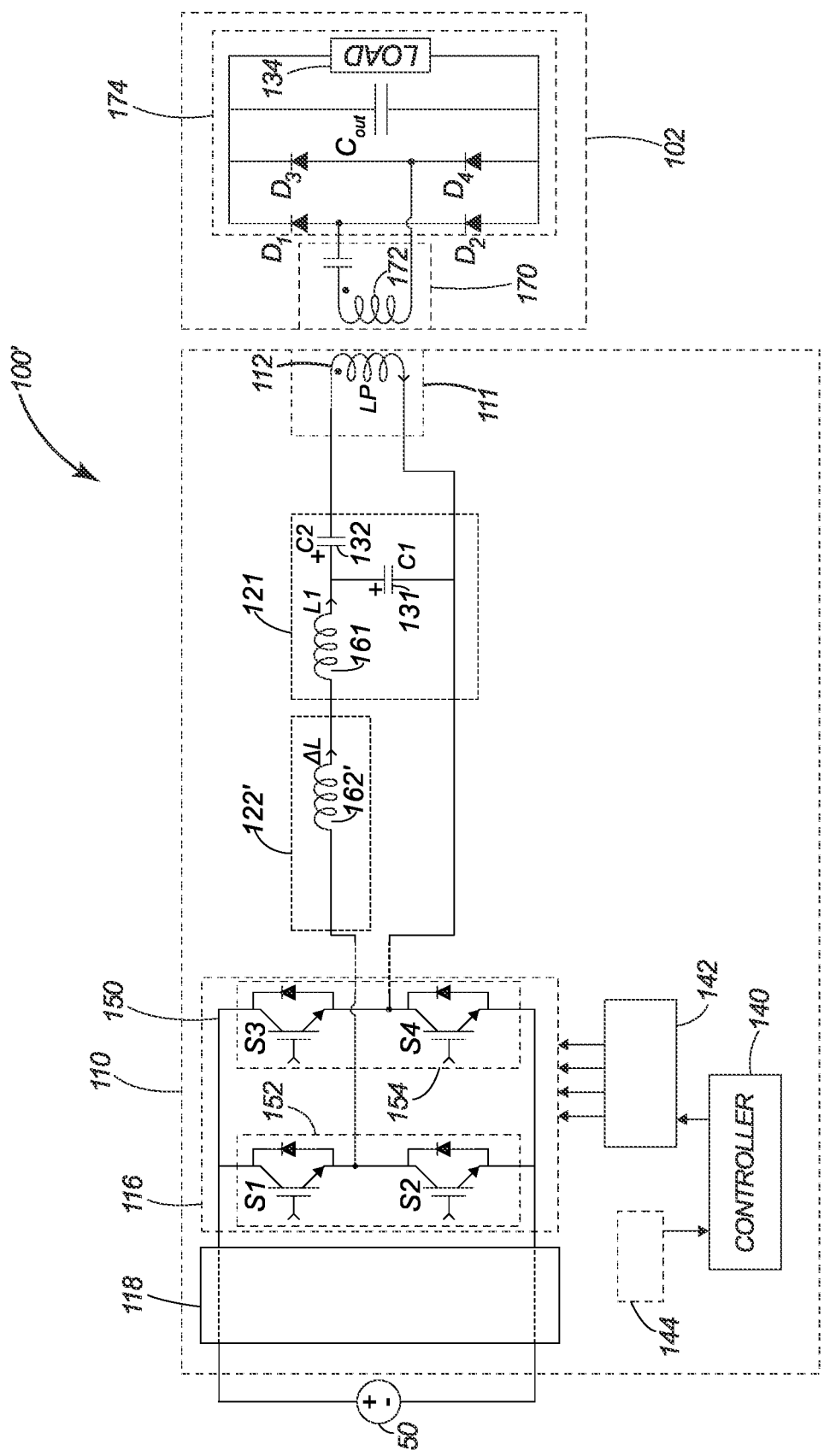
FIG. 2 shows an alternative wireless power supply system in one embodiment according the present disclosure.

In an alternative embodiment depicted in FIG. 2, a wireless power system 100' is shown similar to the wireless power system 100 described in conjunction with FIG. 1. For purposes of disclosure, components of the wireless power system 100 that are substantially similar to those of the wireless power system 100' share the same reference numbers. Components that are configured differently in the illustrated embodiment of FIG. 2 are designated with similar reference numbers with the addition of a "'" designation. More specifically, in the illustrated embodiment of FIG. 2, the second compensation circuitry 122' is similar to the second compensation circuitry 122 with the exception of including a second inductor 162', ΔL without the third, series capacitor 133 depicted in the illustrated embodiment of FIG. 1. In other words, the reactance of the second compensation circuit 122' in the illustrated embodiment does not include a series capacitor. This additional inductance may substantially ensure the continuous conduction operation of the inverter 116 with inductive operation that can enable zero voltage switching that improves the efficiency of the inverter 116.

Figure 3:
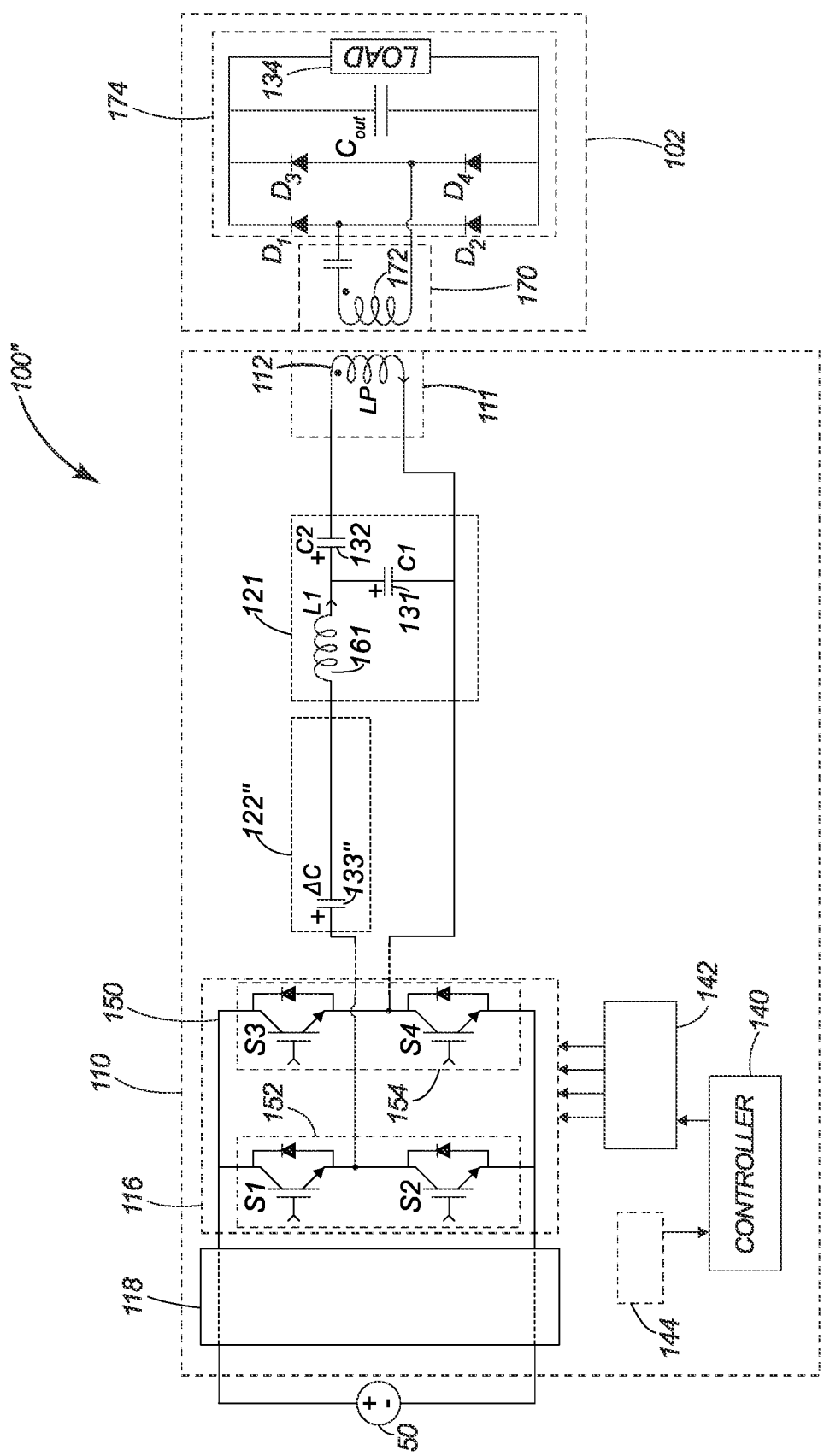
FIG. 3 shows another alternative wireless power supply system in one embodiment according to the present disclosure.

In an alternative embodiment depicted in FIG. 3, a wireless power system 100" is shown similar to the wireless power system 100 described in conjunction with FIG. 1. For purposes of disclosure, components of the wireless power system 100 that are substantially similar to those of the wireless power system 100" share the same reference numbers. Components that are configured differently in the illustrated embodiment of FIG. 3 are designated with similar reference numbers with the addition of a " " "designation. More specifically, in the illustrated embodiment of FIG. 3, the second compensation circuitry 122" is similar to the second compensation circuitry 122 with the exception of including a third capacitor 133, AC without a second inductor 162', ΔL depicted in the illustrated embodiment of FIG. 1. In other words, the reactance of the second compensation circuit 122" in the illustrated embodiment does not include a series inductor. This particular configuration may be used if the inductor 161 of the first compensation network is oversized.

Returning to the illustrated embodiment of FIG. 1, with a second compensation circuit 122 configured in accordance with one embodiment of the present disclosure, the reactance of the second compensation circuit 122 may establish inductive operation of the switching circuitry 116. Such inductive operation may achieve zero voltage switching of the switching circuitry 116 at the switching frequency of the switching circuitry 116. It is noted that a load resistance seen by the switching circuitry 116, with the second inductance 162, ΔL of the second compensation circuit 122 being tuned out by the capacitor 133, the load resistance can be determined as follows:

$$R_{load} = \frac{2V_{dc}}{\pi^2 PF}$$

The inductance of the second inductance 162, ΔL may be determined as follows for providing substantially constant current:

$$\omega \Delta L = R_{load} \sqrt{\frac{1}{PF^2} - 1}$$

The second compensation circuit 122 in accordance with one embodiment may enhance the power factor seen by the switching circuitry 116. For instance, in accordance with equation 7, the inductance of the second inductor 162, ΔL may include values of 0.14 * R_load or 0.33 * R_load, resulting in a power factor between 0.99 and 0.95, and may bring the switching circuitry 116 of the wireless power system 100 into inductive operating region. And, within the inductive operating region, the switching circuitry 116 may achieve zero voltage switching for the switching frequency of the switching circuitry 116, which corresponds to w identified in equation 7.

The second compensation circuit 122 may mitigate current harmonics of the switching circuitry 116 (e.g., inverter current harmonics) and potentially enhance waveform quality and improve the power conversion efficiency of the switching circuitry 116.

It is noted that there may be a balance between loss reduction of the switching circuitry 116 and an inductor size or loss increase. An inductor value that results in operating the switching circuitry between the 0.95 and 0.99 power factor may enhance operation.

Figure 5:
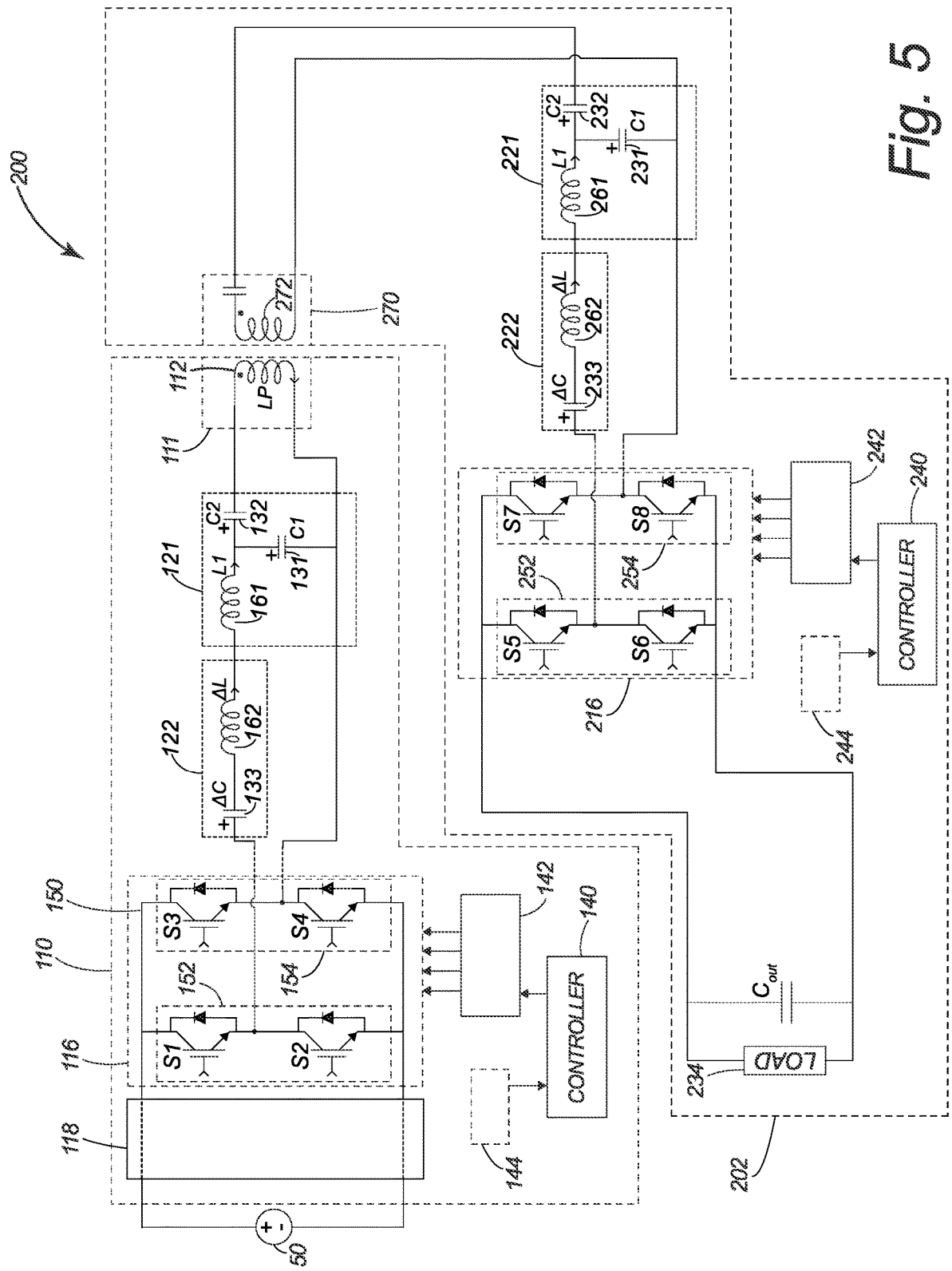
FIG. 5 shows yet another alternative wireless power supply system in one embodiment according to the present disclosure.

An alternative embodiment of a wireless power supply system according to the present disclosure is depicted in FIG. 5 and generally designated 200. The wireless power supply system 200 is similar in many respects to the wireless power supply system 100 described in conjunction with FIG. 1, including a wireless power supply 110 that is substantially similar to and designated using the same reference numbers as the wireless power supply 110 in FIG. 1. A wireless power supply system 200 in FIG. 5 includes a remote device 202 configured for bidirectional power transfer between the remote device 202 and the wireless power supply 110.

The remote device 202 in the illustrated embodiment may be similar to the remote device 102 described herein. For example, the remote device 202 may correspond to or be incorporated into a vehicle 52—although it should be understood the remote device 202 may be incorporated into any type of device.

The remote device 202 in the illustrated embodiment includes a load 234, such as a battery, operable to use power received wirelessly from the wireless power supply 110 or to transmit power wirelessly to the wireless power supply 110. For instance, the wireless power receiver 170 may be coupled to a load 234 to provide power thereto. The load 234 in the illustrated embodiment is part of or coupled to the remote device switching circuitry 216 operable to receive power from the wireless power receiver 270. The remote device switching circuitry 216 may be operable as active or passive rectification circuitry configured to rectify power received wirelessly from the wireless power supply 110 for delivery of the received power to the load 234.

The load 234 may include a battery (or a battery with its battery management system [BMS]) or any type of principle load, or a combination thereof. The wireless power receiver 270 in the illustrated embodiment includes a receiver 272 (e.g., a secondary coil or a pick-up coil).

In the illustrated embodiment, the remote device 202 includes a controller 240 and drive circuitry 242, similar to the controller 140 and drive circuitry 142 described in conjunction with the wireless power supply 110. Similar to the wireless power supply 110, the remote device 202 may optionally include a sensor 244, which may provide sensor output to the controller 240. Such sensor output may be used by the controller 240 as a basis for adjusting operation of the remote device switching circuitry 216.

The remote device switching circuitry 216 may include a plurality of switches S5, S6, S7, S8 arranged similar to the switches S1, S2, S3, S4 described in conjunction with the switching circuitry 116. For instance, the switches S5, S6, S7, S8 may be arranged in an H-bridge configuration with a first leg 252 and a second leg 254.

The controller 240 of the remote device 202 may be configured to direct operation of the remote device switching circuitry 216 to drive the receiver 272 with an AC signal to transmit power wirelessly, instead of receiving power wirelessly, to the transmitter 112 of the wireless power supply 110. The controller 240 may direct such operation in a manner similar to the controller 140 of the wireless power supply 110, such as by controlling operation of the remote device switching circuitry 216 according to a switching frequency in order to operate as an inverter.

The remote device 202 may include first remote device compensation circuitry 221, which may be configured in any manner similar to the first compensation circuitry 121. Likewise, the remote device 202 may include second remote device compensation circuitry 222, which may be configured in any manner similar to the second compensation circuitry 122 of the wireless power supply 110. For example, the first remote device compensation circuitry 221 may include a first inductor 261, a first capacitor 231, and a second capacitor 232 arranged in an LCC configuration. The second remote device compensation circuitry 222 may include a second inductor 262, ΔL and a third capacitor 233, AC provided in series with the first inductor 261 of the first remote device compensation circuitry 221. The second remote device compensation circuitry 222 may be operable to facilitate or establish inductive operation of the remote device switching circuitry 216 in a manner similar to the second compensation circuit 122 with respect to the switching circuitry 116 of the wireless power supply 110.

The second remote device compensation circuitry 222 may be configured in a variety of ways similar to the second compensation circuitry 122. For example, the second remote device compensation circuitry 222 may include one or both of the second inductor 262 and the third capacitor 233. The reactants of the second remote device compensation circuitry 222 may facilitate operation of the remote device switching circuitry 216 in an inductive mode. Such inductive operation of the remote device switching circuitry 216 may establish zero voltage switching for the remote device switching circuitry 216 and/or enhance a power factor of operation.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A wireless power transfer (WPT) system for wirelessly providing high-frequency AC power to an electric vehicle (EV) or a plug-in electric vehicle (PEV), the system comprising:
    an off-board transmitter including:
        an inverter having an output;
        a transmitter coil configured to wirelessly transmit the high-frequency AC power; and
        a resonant tuning network comprising first circuitry coupled to the transmitter coil and second circuitry coupled between the output of the inverter and the first circuitry;
        wherein the first circuitry includes:
            a first inductor and a first capacitor connected in series to the transmitter coil, and
            a second capacitor connected in parallel to the first capacitor and the transmitter coil;
        wherein the second circuitry is configured to cause inductive operation of the inverter at a switching frequency of the inverter that corresponds to a power factor in a range 0.80 to 0.99;
        wherein the second circuitry includes:
            a second inductor connected in series to the first inductor of the first circuitry, and
            a second capacitor connected in series to the second inductor, and
        wherein inductance of the second inductor and capacitance of the second capacitor are configured to cause the second circuitry to
            resonate at the switching frequency of the inverter,
            establish zero voltage switching operation for the inverter at a switching frequency of the inverter, and
            mitigate current harmonics of the inverter.

2. The WPT system of claim 1, wherein the second inductor includes additional winding that is wound on a core of the first inductor, and wherein the additional winding extends a winding of the first inductor.

3. The WPT system of claim 1, wherein the inductive operation of the inverter caused by the configuration of the second circuitry corresponds to a power factor in a range of 0.95 to 0.99.

4. The WPT system of claim 1, wherein a fundamental frequency of the high-frequency AC power is in a range of 3 kHz-10 MHz.

5. The WPT system of claim 4, wherein the fundamental frequency is about 85 kHz.

6. The WPT system of claim 1, comprising a wireless power receiver including:
    a receiver comprising a pick-up coil, the receiver configured to receive the high-frequency AC power when the transmitter coil and the pick-up coil are disposed adjacent to each other, a receiver side resonant tuning network, and a high-frequency rectifier to provide DC current to a receiver-side load.

7. The WPT system of claim 6 wherein the receiver-side load is a battery.

8. A system for wirelessly transferring power to a remote device, the system comprising:
    a transmitter configured to wirelessly transmit power to a receiver of the remote device;
    switching circuitry coupled to the transmitter, the switching circuitry configured to receive power from a power supply, the switching circuitry configured to supply power to the transmitter based on the power received from the power supply;

control circuitry operably coupled to the switching circuitry, the control circuitry configured to direct operation of the switching circuitry according to a switching frequency;

first tuning circuitry coupled directly to the transmitter, the first tuning circuitry including a first inductor and a first capacitor connected in series with the transmitter, the first tuning circuitry including a second capacitor connected in parallel to the first capacitor and the transmitter; and second tuning circuitry coupled directly to the switching circuitry, the second tuning circuitry operable to direct power from the switching circuitry to the first tuning circuitry for supply to the transmitter, the second tuning circuitry including a reactance operable to
  establish (i) inductive operation of the switching circuitry at the switching frequency of the switching circuitry that corresponds to a power factor in a range 0.80 to 0.99, and (ii) zero voltage switching operation for the switching circuitry at the switching frequency of the switching circuitry, and
  mitigate current harmonics of the switching circuitry,
wherein the second tuning circuitry includes a second inductor provided in series with, and different from, the first inductor of the first tuning circuitry, wherein an inductance of the second inductor defines at least a portion of the reactance of the second tuning circuitry.

9. The system of claim 8 wherein the first inductor includes a main winding portion, and wherein the second inductor corresponds to a supplemental winding portion of the first inductor.

10. The system of claim 8 wherein the first inductor includes an inductor core with a magnetic airgap, and wherein the second inductor is established by reducing the magnetic airgap of the first inductor.

11. The system of claim 8 wherein the second tuning circuitry includes a third capacitor provided in series with the second inductor and the first inductor of the first tuning circuitry, wherein a capacitance of the third capacitor and the inductance of the second inductor define the reactance of the second tuning circuitry.

12. The system of claim 8 wherein the second tuning circuitry includes a third capacitor provided in series with the first inductor of the first tuning circuitry, wherein a capacitance of the third capacitor defines at least a portion of the reactance of the second tuning circuitry.

13. The system of claim 8 comprising the remote device, wherein the remote device includes a load, and wherein the remote device is operable to supply power received from the transmitter, via the receiver, to the load.

14. The system of claim 8 wherein the power factor corresponding to the established inductive operation of the switching circuitry is in a range of 0.95 to 0.99.

15. The system of claim 8 wherein the switching frequency is between 3 kHz and MHz.

16. The system of claim 15 wherein the switching frequency is about 85 kHz.

17. The system of claim 15 wherein the switching frequency is varied by the control circuitry.

* * * * *